US008838125B2

(12) United States Patent
Dalsgaard et al.

(10) Patent No.: US 8,838,125 B2
(45) Date of Patent: Sep. 16, 2014

(54) INTERFERER ACTIVITY SIGNALING FOR TIME DOMAIN (TDM) INTER-CELL INTERFERENCE COORDINATION (ICIC)

(75) Inventors: Lars Dalsgaard, Oulu (FI); Petteri Lundén, Espoo (FI); Elena Virtej, Espoo (FI)

(73) Assignee: Nokia Corporation, Espoo (FI)

( * ) Notice: Subject to any disclaimer, the term of this patent is extended or adjusted under 35 U.S.C. 154(b) by 222 days.

(21) Appl. No.: 13/538,364

(22) Filed: Jun. 29, 2012

(65) Prior Publication Data
US 2014/0004866 A1 Jan. 2, 2014

(51) Int. Cl.
H04W 72/00 (2009.01)
(52) U.S. Cl.
USPC ....... 455/450; 455/63.1; 455/451; 455/452.1; 455/452.2; 370/332; 370/352; 370/350; 370/348
(58) Field of Classification Search
CPC .... H04B 17/005; H04B 1/7103; H04B 1/719; H04B 7/0632; H04W 28/048; H04W 52/244; H04W 72/12; H04W 52/367; H04W 52/24; H04W 52/32; H04W 52/36; H04W 16/14
USPC ......... 455/63.1, 67.1, 445, 450, 452.2, 452.1; 370/352, 332, 350, 348
See application file for complete search history.

(56) References Cited

U.S. PATENT DOCUMENTS

| 2007/0135125 A1* | 6/2007 | Kim et al. ..................... 455/436 |
| 2012/0115469 A1 | 5/2012 | Chen et al. |
| 2012/0115485 A1* | 5/2012 | Narasimha et al. ........... 455/437 |
| 2012/0122440 A1 | 5/2012 | Krishnamurthy et al. |
| 2013/0142175 A1* | 6/2013 | Manssour et al. ............ 370/336 |
| 2013/0223268 A1* | 8/2013 | Jung et al. ..................... 370/252 |

FOREIGN PATENT DOCUMENTS

WO 2011/159988 A1 12/2011
WO WO 2012085661 A8 * 6/2012 ............ H04W 52/24

OTHER PUBLICATIONS

Yuanye Wang et al., "Time and Power Domain Interference Management for LTE Networks with Macro-cells and HeNBs", Vehicular Technology Conference (VTC Fall), 2011 IEEE. 2011, 7 pages.
International Search Report and Written Opinion international application No. PCT/FI2013/050609 dated Oct. 3, 2013.

* cited by examiner

*Primary Examiner* — Khalid Shaheed
(74) *Attorney, Agent, or Firm* — Squire Patton Boggs (US) LLP

(57) ABSTRACT

A method and apparatus for fast interference signaling is provided. The method may include configuring, by an evolved node B (eNB), at least one user equipment to indicate to the eNB when an activity state of at least one interferer changes. Based on the indicated activity state, the eNB can schedule the at least one user equipment in muted subframes of the interferer or almost blank subframes (ABS).

26 Claims, 4 Drawing Sheets

INTERFERER ACTIVITY SIGNALING FOR TIME DOMAIN (TDM) INTER-CELL INTERFERENCE COORDINATION (ICIC)

BACKGROUND

1. Field

Embodiments of the invention generally relate to wireless communications networks, such as, but not limited to, the Universal Mobile Telecommunications System (UMTS) Terrestrial Radio Access Network (UTRAN) and/or Long Term Evolution (LTE) Evolved UTRAN (E-UTRAN) or LTE-Advanced (LTE-A).

2. Description of the Related Art

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (Evolved UTRAN) no RNC exists and most of the RNC functionalities are contained in the evolved Node B (eNB).

Long Term Evolution (LTE) or E-UTRAN refers to enhancements of the UMTS through improved efficiency and services, lower costs, and use of new spectrum opportunities. In particular, LTE is a 3GPP technical standard that provides for uplink peak rates of at least 50 megabits per second (Mbps) and downlink peak rates of at least 100 Mbps. LTE supports scalable carrier bandwidths from 20 MHz down to 1.4 MHz and supports both Frequency Division Duplex (FDD) and Time Division Duplex (TDD).

As mentioned above, LTE is also expected to improve spectral efficiency in 3G networks, allowing carriers to provide more data and voice services over a given bandwidth. Therefore, LTE is designed to fulfill future needs for high-speed data and media transport in addition to high-capacity voice support. Advantages of LTE are, for example, high throughput, low latency, FDD and TDD support in the same platform, an improved end-user experience, and a simple architecture resulting in low operating costs.

Further releases of 3GPP LTE (e.g., Rel-10, Rel-11) are targeted towards future international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A will be a more optimized radio system fulfilling the international telecommunication union-radio (ITU-R) requirements for IMT-Advanced while keeping the backward compatibility.

SUMMARY

One embodiment includes a method for fast interference signaling. The method may include configuring, by an evolved node B (eNB), at least one user equipment to indicate to the eNB when an activity state of at least one interferer changes. Based on the indicated activity state, the method may further include scheduling the at least one user equipment in muted subframes of the interferer or almost blank subframes (ABS).

Another embodiment includes an apparatus which may include at least one processor and at least one memory comprising computer program code. The at least one memory and the computer program code may be configured, with the at least one processor, to cause the apparatus at least to configure at least one user equipment to indicate to the apparatus when an activity state of at least one interferer changes, and, based on the indicated activity state, to schedule the at least one user equipment in muted subframes of the interferer or almost blank subframes (ABS).

Another embodiment may include a computer program, embodied on a computer readable medium. The computer program may be configured to control a processor to perform a process including configuring at least one user equipment to indicate to the eNB when an activity state of at least one interferer changes. The process may further include, based on the indicated activity state, scheduling the at least one user equipment in muted subframes of the interferer or almost blank subframes (ABS).

Another embodiment is directed to a method including measuring a relative difference in interference in muted and other subframes of an interferer, and indicating to an evolved node B (eNB) when an activity state of the interferer changes based on the measuring.

Another embodiment includes an apparatus which may include at least one processor and at least one memory comprising computer program code. The at least one memory and the computer program code may be configured, with the at least one processor, to cause the apparatus at least to measure a relative difference in interference in muted and other subframes of an interferer, and to indicate to an evolved node B (eNB) when an activity state of the interferer changes based on the measuring.

Another embodiment may include a computer program, embodied on a computer readable medium. The computer program may be configured to control a processor to perform a process including measuring a relative difference in interference in muted and other subframes of an interferer, and indicating to an evolved node B (eNB) when an activity state of the interferer changes based on the measuring.

BRIEF DESCRIPTION OF THE DRAWINGS

For proper understanding of the invention, reference should be made to the accompanying drawings, wherein.

DETAILED DESCRIPTION:

It will be readily understood that the components of the invention, as generally described and illustrated in the figures herein, may be arranged and designed in a wide variety of different configurations. Thus, the following detailed description of the embodiments of a system, a method, an apparatus, and a computer program product for fast interference signaling for time domain (TDM) inter-cell interference coordination (ICIC), as represented in the attached figures, is not intended to limit the scope of the invention, but is merely representative of selected embodiments of the invention.

If desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

Embodiments of the invention relate to enhancements of non-carrier aggregation (CA) based TDM ICIC for LTE. In particular, one embodiment provides a new fast interference signaling method for TDM ICIC. Enhancements to TDM ICIC mechanism are being standardized in LTE Rel-10 and Rel-11, these may be referred to also as TDM eICIC (enhanced ICIC) or TDM feICIC (further enhanced ICIC).

LTE Rel-10 specifies TDM ICIC for interference coordination based on muting subframes. The muting is accomplished by using at least partially muted, e.g., almost blank subframe (ABS) or multimedia broadcast multicast service single frequency network (MBSFN), subframes in a periodic pattern. TDM ICIC is mainly directed to co-channel macro-closed subscriber group (CSG) home eNB (HeNB) and macro-pico interference scenarios, but can be available for other scenarios as well. Accordingly, the embodiments described herein are not limited to use with a CSG HeNB, but may also be available for other types of small cells.

Figure 1:
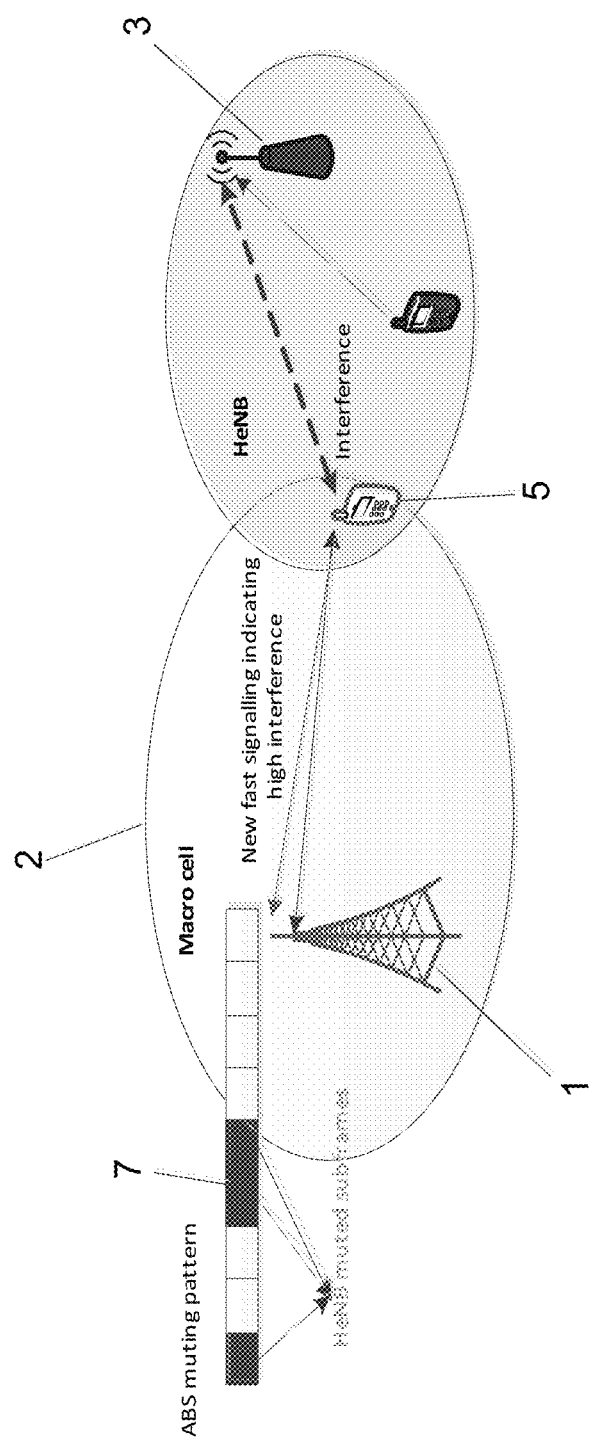
FIG. 1 illustrates a system according to one embodiment of the invention.

FIG. 1 illustrates an example of a heterogeneous network containing both a macro eNB 1 and CSG HeNBs 3, in which the operations, administration and maintenance (OAM)/network informs both the macro eNB 1 and the HeNBs 3 about the muting pattern. The macro eNB 1 needs to know when to schedule the macro UEs 5 that are experiencing bad channel conditions, while the HeNB 3 should be informed when to mute certain subframes 7. A goal is to protect the macro UEs 5 from interference from CSG HeNB 3 and maintain macro cell 2 coverage even close to non-allowed CSG HeNBs 3.

In a small cell, however, the traffic can often be very bursty due to the typically small number of served users. In fact, it may even be just one user. As a result, a nearby macro cell UE could experience alternating heavy interference and low interference levels, depending on the traffic activity of the small cell users.

The current LTE specification(s) assumes that the used muting pattern in the macro cell and small cell are coordinated and may change, but probably limited to a semi-static configuration which is not adaptable to the instant data flow and potential interference from CSG cell to macro UE. Therefore, some embodiments address the problem of how to take advantage of these interference variations of small cell interference. In other words, how to maximize the usage of the macro cell's resources and enable better throughput performance for a UE in a deployment where macro UE scheduling is restricted, for example, due to deployment of the CSG cell.

Accordingly, embodiments of the invention provide a method that allows non-restricted scheduling of a macro UE located in a coverage area of a non-accessible cell when this is possible due to no active scheduling in the non-accessible cell. A goal is to avoid excessively tight scheduling restrictions for the macro UEs near interfering CSG HeNB. When the interferer is inactive, the macro UE could be scheduled in all the subframes without restriction thereby enabling better user throughput.

More specifically, embodiments of the invention provide apparatuses and methods that allow quick reaction to varying traffic activity of interferers. Some embodiments of the invention may be particularly applicable to bursty interferers, such as an interfering CSG HeNB, but are not necessarily limited to such bursty interferers. According to one embodiment, when the interferer is active, an interfered macro UE is scheduled only in muted subframes, and when the interferer is silent, the macro UE can be scheduled freely as mentioned above.

In order to enable this flexibility, embodiments provide a method where the macro UE is enabled with fast feedback channel allowing the macro eNB to quickly react to the change in scheduling restrictions and thereby restrict the scheduling of the macro UE to be within the non-accessible cell's muted sub-frames or almost blank sub-frames (ABS).

As discussed above, some embodiments may apply to TDM ICIC (enhanced ICIC). According to an embodiment, the UE served by a macro eNB is configured to indicate to the network when the activity state of an interferer, such as a (non-allowed) CSG HeNB interferer, changes. For instance, the change in activity state may include when interference in non-ABS from CSG cell exceeds a given threshold level. The UE may be configured with a message containing at least one of the muting pattern to follow, state transition threshold, time to trigger, and/or CGI of the CSG cell.

The muting pattern to follow may indicate to the UE the muted and non-muted subframes that the UE should measure and compare. The state transition threshold may include reference signal received power (RSRP), reference signal received quality (RSRQ), received signal strength indicator (RSSI), or channel quality indicator (CQI) absolute level or difference (between muted and non-muted). The difference here may mean the relative interference (muted vs. non-muted), i.e., the difference of measurements in the muted and non-muted subframes. This shows the interferer activity (because muted subframes are known not to be interfered by the CSG HeNB, or if partially muted they are known to be less interfered by the CSG HeNB). If the CQI/interference/measurement level is the same (or close to the same) in both muted and non-muted subframes, then there is no need to restrict scheduling, regardless of the absolute level. Alternatively, the UE may autonomously (without explicitly configured threshold) decide if it is able to receive on the non-muted subframes, or whether it is beneficial to restrict the scheduling to muted subframes only. For example, the UE may autonomously make the decision based on received interference during non-ABS, or based on the difference of received interference between ABS and non-ABS.

The time to trigger may refer to how long the changed condition has to hold valid for the UE to send a report. This can be used to limit the number of signaling events, and can also be used to provide instant reporting for fast reaction. The CGI of the CSG cell may be needed if the UE is reporting RSRP or RSRQ of the interferer HeNB, and may be needed to enable the UE to differentiate the CSG from other cells. The UE may also be configured to monitor interference from any interferer(s), not a particular one. The UE may then measure and compare relative interference in muted and non-muted subframes without identifying the source of interference causing the difference between measured interference in muted and non-muted subframes.

According to an embodiment, based on the indicated activity state, the macro eNB schedules the UE only in muted subframes of the CSG, almost blank subframes (ABS), or without restriction. If several UEs are interfered by the same interferer (e.g., CSG HeNB), only one of the UEs needs to monitor the interferer activity, but more than one UE may be configured to do so.

In one embodiment, the state transition can trigger an implicit change of the CQI measurement restriction pattern. According to an embodiment, the change may be based on state indicated by the UE and the muting pattern configured to the UE by the network. The UE may toggle between reporting CQI only for muted and for all subframes. In an embodiment, based on the interference state reported by the UE, these restrictions are activated/inactivated (switched on/off) implicitly, i.e., without the network reconfiguring them. In this manner, the UE is measuring and reporting CQI for the schedulable subset of resources in both states, without the need to explicitly signal the changes whenever the state changes (which could happen often due to the bursty nature of interference). This also takes advantage of the known structure of the interference.

Figure 2:
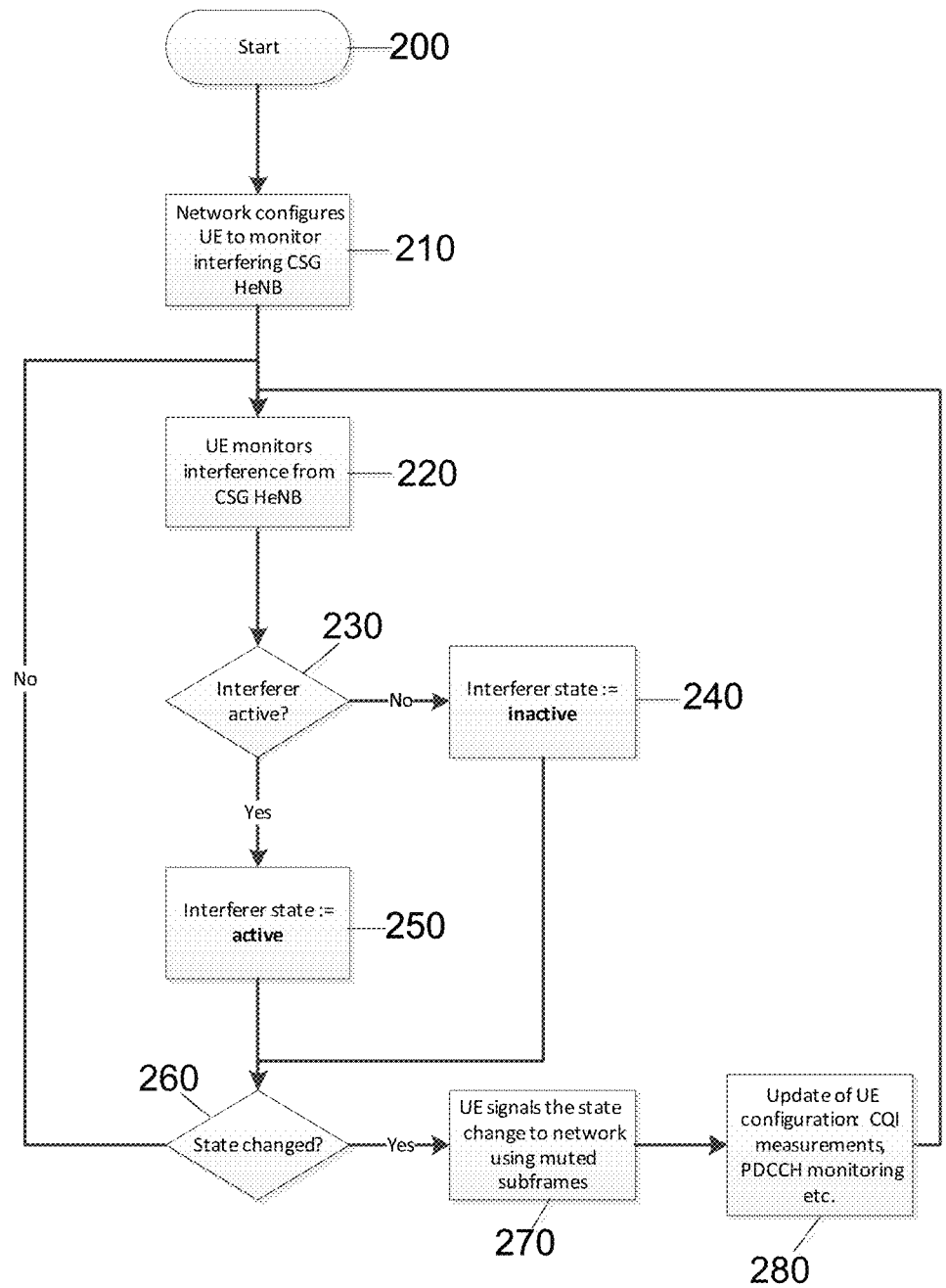
FIG. 2 illustrates a flow diagram of a method according to one embodiment.

FIG. 2 illustrates an example of a flow diagram of a method, according to one embodiment. The method starts at 200 and, at 210, includes the network configuring the UE to monitor, for example, interfering CSG HeNB(s). It should be noted that the CSG HeNB represents only one example of interferers, as embodiments are applicable to other types of interferers as well. Also, in some embodiments the UE may be configured to follow a certain subframe pattern instead of a particular interferer. In this case the UE monitors (measures and compares) the interference in that subframe pattern vs. other subframes (or other given subframe pattern).

Returning to FIG. 2, at 220, the method includes the UE monitoring interference from the CSG HeNB(s). At 230, it is determined whether the interferer is inactive 240 or active 250. Then, at 260, it is determined whether there has been a state change in the interferer. If there is not a change in state in the interferer then the flow returns to step 220. If there is a state change in the interferer, then the method includes, at 270, the UE signaling the state change to the network and, at 280, the UE configuration is updated, e.g., CQI measurement reports, PDCCH monitoring. The update of the UE configuration after signaling of state change may be implicit, or may be done after acknowledgement of the state change by the network, or explicitly signaled by the network in response to the UE signaling. Signaling related to indicating the change of state in the interferer and/or to update UE configuration may be done using muted subframes to avoid interference. The flow may then return to 220 where the UE continues monitoring interference.

In the situation where the UE is interfered by multiple CSG cells, those cells are (with currently standardized TDM eICIC) using the same ABS/muting pattern. If the UE then reports measured relative interference in muted vs. non-muted subframes, it does not matter which of the CSG cells is causing the interference. Based on the result, the eNB knows if the UE experiences high interference from any of the CSG cells (or a combination of those cells).

If TDM eICIC for some reason will have different muting patterns in different CSG cells, embodiments of the invention are still applicable. The patterns would most likely be partially overlapping (for efficient use of radio resources). To be useful these patterns would need to be known by the macro eNB so that it could schedule the UE. In this case, one option is for the eNB to configure the UE's measurements based on the most extensive pattern (or union of the individual patterns). Another option is to configure separate reporting for each CSG cell (or each separate muting pattern of a CSG cell). This is possible because there is typically only a small number of CSGs (most likely just one) that is interfering with the UE severely. However, if the muting patterns of the cells are mostly the same, this can be handled in a simpler way using the first option.

In view of the above, embodiments of the invention provide a fast feedback mechanism for updating the activity of an interferer present only in a subset of radio resources (e.g., CSG HeNB using ABS). In an embodiment, the eNB restricts scheduling of the UE according to this information. The UE measures relative difference in interference in muted vs. other subframes (taking advantage of prior knowledge of interferer activity pattern, and the bursty on/off nature of the interference as well as known un-interfered muted subframes) and reports to the eNB based on the measurement(s). According to one embodiment, CQI measurement restrictions are implicitly switched on/off based on the interferer activity state. The CQI may be averaged over only those subframes that are muted, or over all subframes.

In one embodiment, it is assumed that the fast feedback from the UE to the network is only needed when the UE is within the coverage of the interferer, e.g., the non-accessible CSG cell, and the UE has active data transmission. Also, it should be noted that, while the CSG cell has been used as an example, embodiments of the invention can also be applied to other use cases. In addition, instead of muted subframes or ABS, this method may be applied to some other subset of radio resources (e.g. frequency resources or time-frequency resource blocks) that is partially or fully interference protected.

According to an embodiment, in one signaling implementation, no dedicated resources are reserved and signaling is assumed to take place infrequently. A new MAC control element may be introduced for this purpose. The network (e.g., macro eNB) configures the UE to report this.

According to another embodiment, in an alternative signaling implementation, signaling resources (dedicated or shared) are reserved and signaling is assumed to take place frequently, in some embodiments possibly even periodically indicating the interferer activity state even if it has not changed. A new CQI-style report or a CQI report having an extra bit indicating the state may be used, or a scheduling request type of signaling may be used. The resources for feedback may be reserved in the CSG cells muted subframes to allow the signaling to happen without interference, when the HeNB becomes active. This would ensure maximum probability of successful uplink (UL) transmission to the macro eNB and minimum interference to the CSG cell. Similarly feedback from the network to UE (e.g., reconfiguration or acknowledgements etc.) may use muted subframes.

Additionally, in one embodiment, when the indication has been triggered on the UE side and a signal (see above) has been transmitted in UL to the macro cell that the UE is now experiencing interference on CSG cells non-ABS, the UE may start to use only CSG muted frames (apply the ABS pattern). By doing so, the UE will stop PDCCH monitoring in DL outside the ABS pattern and the UE will only transmit in UL according the ABS pattern. In one embodiment, the network may signal to the UE that it can stop monitoring the PDCCH outside the ABS pattern.

In an embodiment, when the CSG interference has decreased the UE will signal this to network and the UE will start to monitor the PDCCH also outside the CSG ABS pattern. As a further improvement, the macro eNB could signal to the UE when it starts to potentially schedule the UE also beyond the ABS.

Triggering the reporting may be based on detecting that the macro UE is in a 'coverage hole' caused, for example, by a non-allowed CSG HeNB. This may happen, for example, on the network side observing difference in the UE's link quality between muted and normal subframes, or by the UE reporting a CSG HeNB that is stronger than the serving macro cell. Based on this information, the eNB could configure the UE with the proposed settings for enabling the described behavior.

Figure 3:
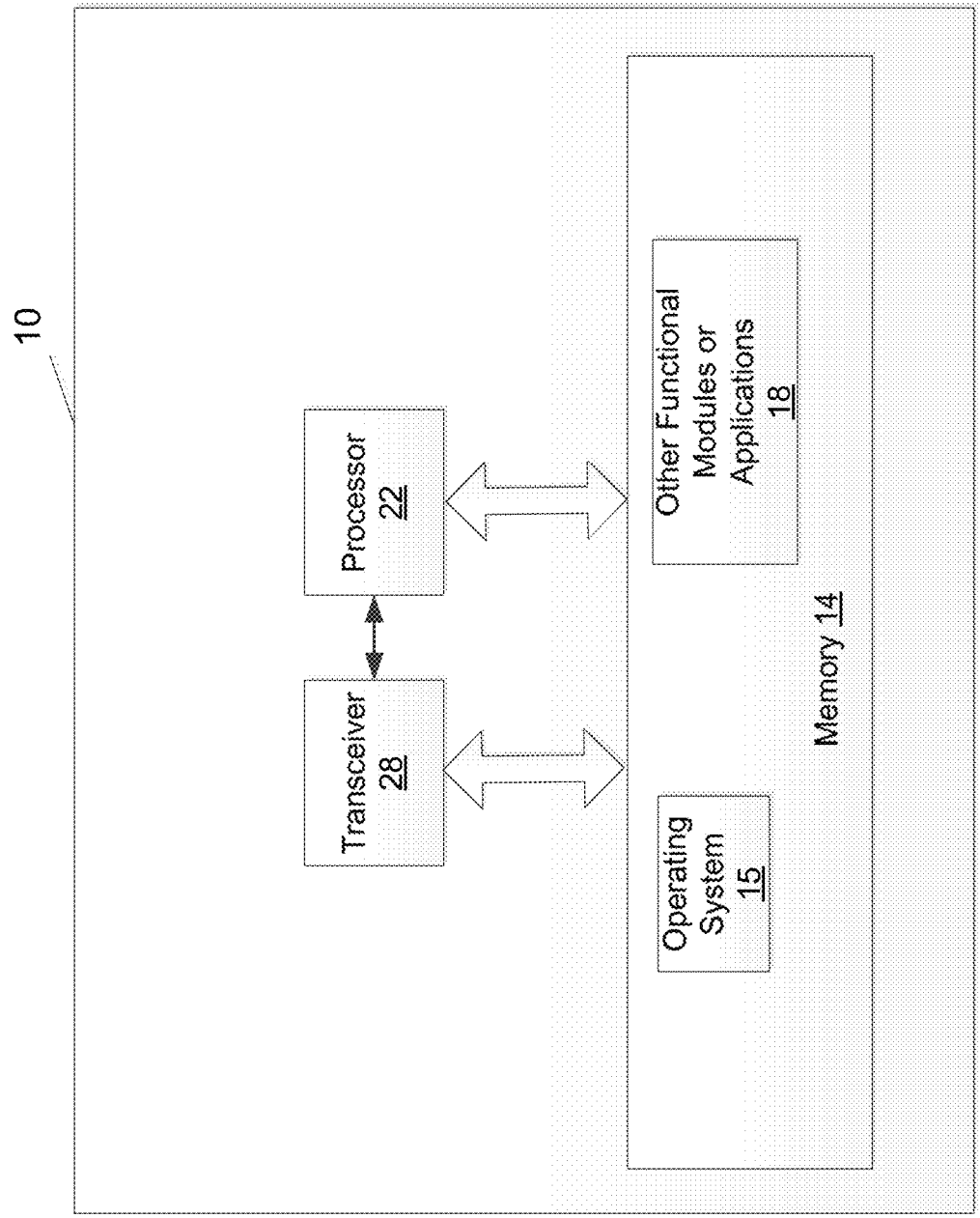
FIG. 3 illustrates an apparatus according to one embodiment.

FIG. 3 illustrates an apparatus 10 configured for fast interference signaling, according to an embodiment. In one embodiment, apparatus 10 may be an eNB, such as a macro eNB, as illustrated in FIG. 1 discussed above. In other embodiments, apparatus 10 may be a UE, such as a macro UE (UE served by macro cell), illustrated in FIG. 1.

It should be noted that FIG. 3 does not necessarily illustrate all components of apparatus 10. Only those components necessary for understanding embodiments of the invention are illustrated, but one of ordinary skill in the art would understand that apparatus 10 may include additional components that are not illustrated.

Apparatus 10 includes a processor 22 for processing information and executing instructions or operations. Processor 22 may be any type of general or specific purpose processor. While a single processor 22 is shown in FIG. 3, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 further includes a memory 14, coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory ("RAM"), read only memory ("ROM"), static storage such as a magnetic or optical disk, or any other type of non-transitory machine or computer readable medium. The instructions stored in memory 14 may include program instructions or computer program code that, when executed by processor 22, enable the apparatus 10 to perform tasks as described herein.

Apparatus 10 may also include one or more antennas (not shown) for transmitting and receiving signals and/or data to and from apparatus 10. Apparatus 10 may further include a transceiver 28 that modulates information on to a carrier waveform for transmission by the antenna(s) and demodulates information received via the antenna(s) for further processing by other elements of apparatus 10. In other embodiments, transceiver 28 may be capable of transmitting and receiving signals or data directly.

Processor 22 may perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 stores software modules that provide functionality when executed by processor 22. The modules may include an operating system 15 that provides operating system functionality for apparatus 10. The memory may also store one or more functional modules 18, such as an application or program, to provide additional functionality for apparatus 10. The components of apparatus 10 may be implemented in hardware, or as any suitable combination of hardware and software.

As mentioned above, in one embodiment, apparatus 10 may be an eNB, such as a macro eNB operating in a heterogeneous network. In this embodiment, apparatus 10 is controlled by memory 14 and processor 22 to configure at least one UE to indicate to the apparatus 10 when an activity state of at least one interferer (e.g., bursty interferer) changes. Based on the indicated activity state, apparatus 10 may be controlled by memory 14 and processor 22 to schedule the at least one UE in muted subframes of the interferer or almost blank subframes (ABS) of the bursty interferer.

In one embodiment, the interferer may be a bursty interferer, such as a closed subscriber group (CSG) home evolved node B (HeNB). According to some embodiments, apparatus 10 may be controlled by memory 14 and processor 22 to to configure the at least one user equipment to indicate that the activity state of the at least one interferer has changed when interference in non-almost blank subframes (ABS) from the closed subscriber group (CSG) cell exceeds a predetermined threshold level.

In some embodiments, apparatus 10 is controlled by memory 14 and processor 22 to configure the at least one user equipment with a message containing at least one of a muting pattern to follow, state transition threshold, time to trigger, or cell global identifier of the bursty interferer. Additionally, in some embodiments, apparatus 10 may be controlled by memory 14 and processor 22 to configure the at least one UE to measure a relative difference in interference in muted and other subframes of the interferer. In an embodiment, the transition of the activity state of the interferer triggers an implicit change of channel quality indicator (CQI) measurement restriction pattern.

In another embodiment, apparatus 10 may be a UE, such as a macro UE operating in a heterogeneous network. In this embodiment, apparatus 10 is controlled by memory 14 and processor 22 to measure a relative difference in interference in muted and other subframes of an interferer (e.g., bursty interferer), and to indicate to an eNB when an activity state of the interferer changes based on the measuring. 27. Additionally, in some embodiments, apparatus 10 may be controlled by memory 14 and processor 22 to autonomously decide when to receive on the muted subframes based on received interference during a non-almost blank subframes (non-ABS), or on a difference of received interference between almost blank subframes (ABS) and the non-almost blank subframes (non-ABS).

Figure 4:
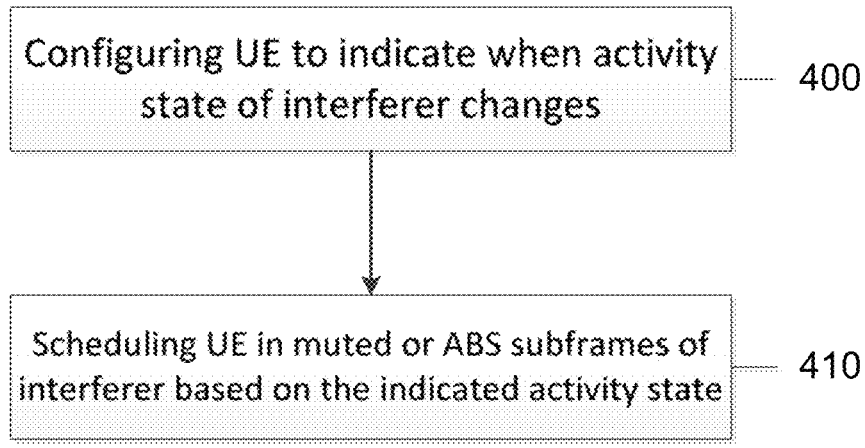
FIG. 4 illustrates a flow diagram of a method according to another embodiment.

FIG. 4 illustrates an example of a flow diagram of a method, according to one embodiment of the invention. The method includes, at 400, configuring, by an eNB, at least one UE to indicate to the eNB when an activity state of at least one interferer changes. At 410, the method may include, based on the indicated activity state, scheduling the at least one UE in muted subframes of the interferer or almost blank subframes (ABS).

Figure 5:
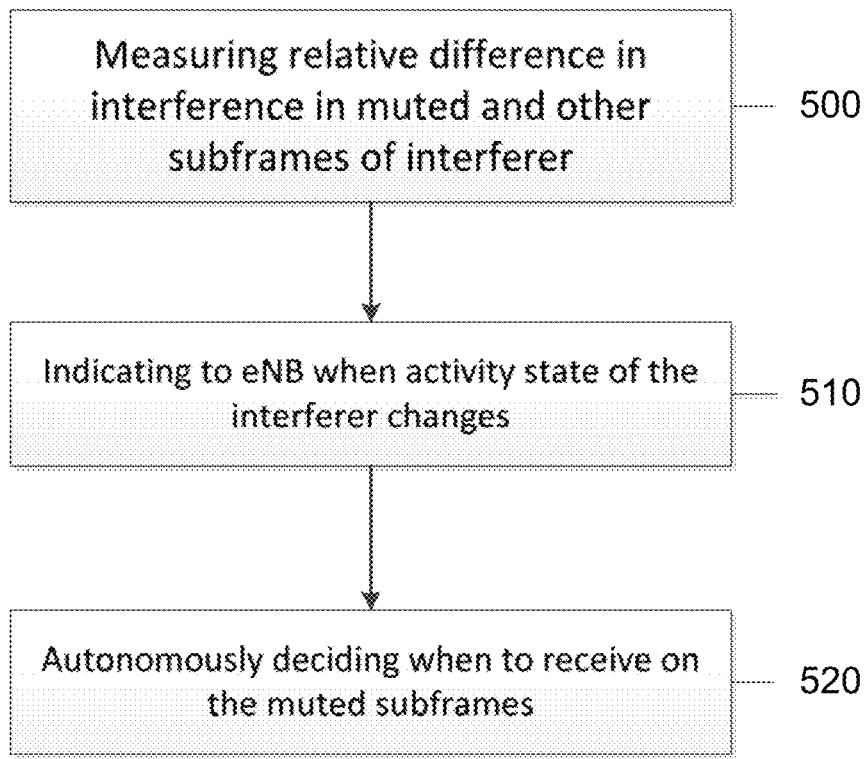
FIG. 5 illustrates a flow diagram of a method according to another embodiment.

FIG. 5 illustrates another example of a flow diagram of a method, according to one embodiment of the invention. The method includes, at 500, measuring a relative difference in interference in muted and other subframes of an interferer. At 510, the method may include indicating to an eNB when an activity state of the interferer changes based on the measuring. The method may further include, at 520, autonomously deciding when to receive on the muted subframes based on received interference during a non-almost blank subframes (non-ABS), or on a difference of received interference between almost blank subframes (ABS) and the non-almost blank subframes (non-ABS).

In some embodiments, the functionality of any of the methods described herein, such as the method of FIGS. 2, 4, and 5, may be implemented by software and/or computer program code stored in memory or other computer readable or tangible media, and executed by a processor. In other embodiments, the functionality may be performed by hardware, for example through the use of an application specific integrated circuit (ASIC), a programmable gate array (PGA), a field programmable gate array (FPGA), or any other combination of hardware and software.

In view of the above, embodiments of the invention provide numerous advantages. For example, according to certain embodiments, a macro eNB can adapt scheduling of interfered UE(s) to traffic variations in activity of an interfering CSG HeNB. As a result, network resources are used more efficiently. UEs interfered by CSG HeNB are restricted to muted subframes only when CSG HeNB is active. Further, embodiments provide a lighter mechanism with less overhead than configuring separate CQI reporting for both muted and normal subframes. The change of state can implicitly reconfigure CQI measurement restriction. As a result, CQI reporting overhead is significantly reduced. Additionally, because the difference in interference level observed is large, less averaging is needed than for CQI measurements, and thus faster signaling of changed conditions is possible.

The described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
configuring, by an evolved node B (eNB), at least one user equipment to indicate to the eNB when an activity state of at least one interferer changes; and
based on the indicated activity state, scheduling the at least one user equipment in muted subframes of the interferer or almost blank subframes (ABS),
wherein the configuring comprises configuring the at least one user equipment with a message containing at least one of a muting pattern to follow, state transition threshold, time to trigger, or cell global identifier of the interferer.

2. The method according to claim 1, wherein the interferer comprises a closed subscriber group (CSG) home evolved node B (HeNB), and wherein the configuring comprises configuring the at least one user equipment to indicate that the activity state of the at least one interferer has changed when interference in non-almost blank subframes (ABS) from the closed subscriber group (CSG) cell exceeds a predetermined threshold level.

3. The method according to claim 1, wherein transition of the activity state triggers an implicit change of channel quality indicator measurement restriction pattern.

4. The method according to claim 1, wherein the configuring comprises configuring the at least one user equipment to measure a relative difference in interference in muted and other subframes of the interferer.

5. The method according to claim 1, wherein the muting pattern to follow is configured to indicate to the at least one user equipment the muted and non-muted subframes that the at least one user equipment is to measure and compare.

6. The method according to claim 1, wherein the state transition threshold comprises at least one of reference signal received power (RSRP), reference signal received quality (RSRQ), received signal strength indicator (RSSI), or channel quality indicator (CQI) absolute level or a difference between muted and non-muted subframes.

7. The method according to claim 1, wherein the time to trigger is configured to indicate how long the change in activity state has to hold valid for the at least one user equipment to send a report.

8. The method according to claim 1, wherein, when more than one of the at least one user equipment are interfered by the same interferer, the method comprises configuring only one of the at least one user equipment to monitor the activity state of the interferer.

9. The method according to claim 4, wherein, when the at least one user equipment is interfered by more than one of the at least one interferer, the configuring comprises configuring the measurements performed by the at least one user equipment based on the interferer with the most extensive pattern of interference.

10. An apparatus, comprising:
at least one processor; and
at least one memory including computer program code, the at least one memory and the computer program code configured, with the at least one processor, to cause the apparatus at least to
configure at least one user equipment to indicate to the apparatus when an activity state of at least one interferer changes; and
based on the indicated activity state, schedule the at least one user equipment in muted subframes of the interferer or almost blank subframes (ABS),
wherein the at least one memory and the computer program code are further configured, with the at least one processor, to cause the apparatus at least to configure the at least one user equipment with a message containing at least one of a muting pattern to follow, state transition threshold, time to trigger, or cell global identifier of the interferer.

11. The apparatus according to claim 10, wherein the interferer comprises a closed subscriber group (CSG) home evolved node B (HeNB), and wherein the at least one memory and the computer program code are further configured, with the at least one processor, to cause the apparatus at least to configure the at least one user equipment to indicate that the activity state of the at least one interferer has changed when interference in non-almost blank subframes (ABS) from the closed subscriber group (CSG) cell exceeds a predetermined threshold level.

12. The apparatus according to claim 10, wherein transition of the activity state triggers an implicit change of channel quality indicator measurement restriction pattern.

13. The apparatus according to claim 10, wherein the at least one memory and the computer program code are further configured, with the at least one processor, to cause the apparatus at least to configure the at least one user equipment to measure a relative difference in interference in muted and other subframes of the interferer.

14. The apparatus according to claim 10, wherein the muting pattern to follow is configured to indicate to the at least one user equipment the muted and non-muted subframes that the at least one user equipment is to measure and compare.

15. The apparatus according to claim 10, wherein the state transition threshold comprises at least one of reference signal received power (RSRP), reference signal received quality (RSRQ), received signal strength indicator (RSSI), or channel quality indicator (CQI) absolute level or a difference between muted and non-muted subframes.

16. The apparatus according to claim 10, wherein the time to trigger is configured to indicate how long the change in activity state has to hold valid for the at least one user equipment to send a report.

17. The apparatus according to claim 10, wherein, when more than one of the at least one user equipment are interfered by the same interferer, the at least one memory and the computer program code are further configured, with the at least one processor, to cause the apparatus at least to configure only one of the at least one user equipment to monitor the activity state of the interferer.

18. The apparatus according to claim 13, wherein, when the at least one user equipment is interfered by more than one of the at least one interferer, the at least one memory and the computer program code are further configured, with the at least one processor, to cause the apparatus at least to configure the measurements performed by the at least one user equipment based on the interferer with the most extensive pattern of interference.

19. The apparatus according to claim 10, wherein the apparatus comprises an evolved node B (eNB).

20. A computer program, embodied on a non-transitory computer readable medium, the computer program configured to control a processor to perform a process, comprising:
   configuring at least one user equipment to indicate when an activity state of at least one interferer changes; and
   based on the indicated activity state, scheduling the at least one user equipment in muted subframes of the interferer or almost blank subframes (ABS),
   wherein the configuring comprises configuring the at least one user equipment with a message containing at least one of a muting pattern to follow, state transition threshold, time to trigger, or cell global identifier of the interferer.

21. A method, comprising:
   measuring, by a user equipment, a relative difference in interference in muted and other subframes of an interferer;
   indicating to an evolved node B (eNB) when an activity state of the interferer changes based on the measuring; and
   autonomously deciding when to receive on the muted subframes based on received interference during a non-almost blank subframes (non-ABS), or on a difference of received interference between almost blank subframes (ABS) and the non-almost blank subframes (non-ABS).

22. The method according to claim 21, wherein the interferer comprises a closed subscriber group (CSG) home evolved node B (HeNB).

23. An apparatus, comprising:
   at least one processor; and
   at least one memory including computer program code,
   the at least one memory and the computer program code configured, with the at least one processor, to cause the apparatus at least to
   measure a relative difference in interference in muted and other subframes of an interferer; and
   indicate to an evolved node B (eNB) when an activity state of the interferer changes based on the measuring,
   wherein the at least one memory and the computer program code are further configured, with the at least one processor, to cause the apparatus at least to autonomously decide when to receive on the muted subframes based on received interference during a non-almost blank subframes (non-ABS), or on a difference of received interference between almost blank subframes (ABS) and the non-almost blank subframes (non-ABS).

24. The apparatus according to claim 23, wherein the interferer comprises a closed subscriber group (CSG) home evolved node B (HeNB).

25. The apparatus according to claim 23, wherein the apparatus comprises a user equipment.

26. A computer program, embodied on a non-transitory computer readable medium, the computer program configured to control a processor to perform a process, comprising:
   measuring a relative difference in interference in muted and other subframes of an interferer;
   indicating to an evolved node B (eNB) when an activity state of the interferer changes based on the measuring; and
   autonomously deciding when to receive on the muted subframes based on received interference during a non-almost blank subframes (non-ABS), or on a difference of received interference between almost blank subframes (ABS) and the non-almost blank subframes (non-ABS).

* * * * *